Figure 4:
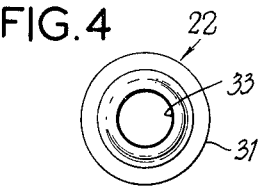

Oct. 26, 1965  E. B. FERNBERG  3,213,506
FASTENER
Filed Oct. 12, 1962  2 Sheets-Sheet 1

Inventor
Eric Birger Fernberg
by Malcolm W. Fraser
attorney

Oct. 26, 1965     E. B. FERNBERG     3,213,506
FASTENER
Filed Oct. 12, 1962     2 Sheets-Sheet 2
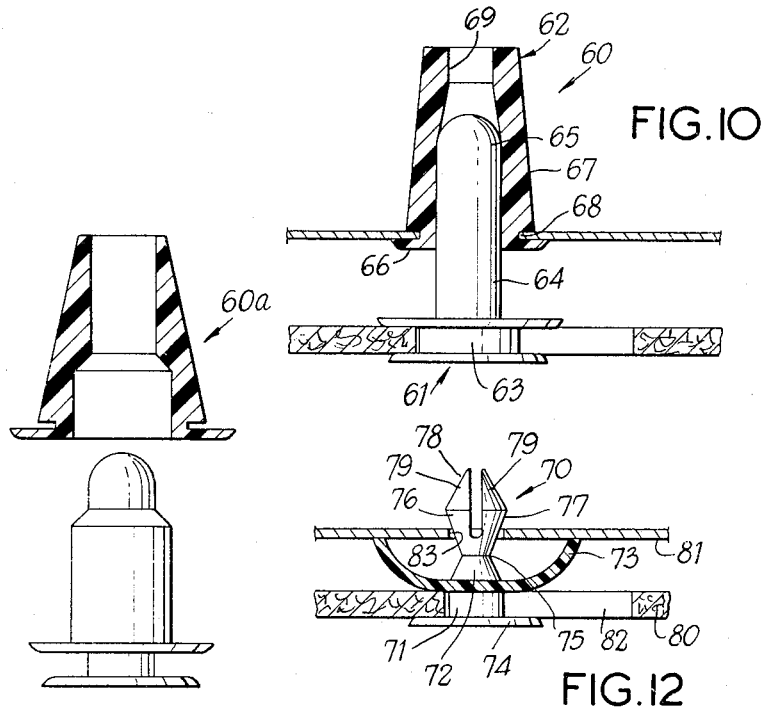
FIG.10
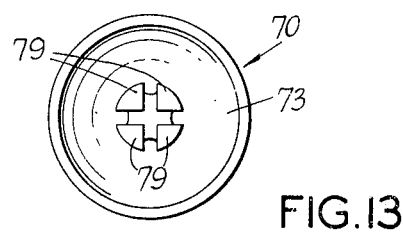
FIG.12
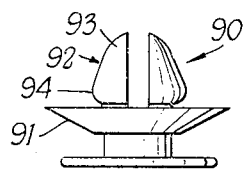
FIG.11
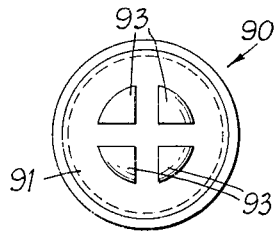
FIG.14
FIG.15
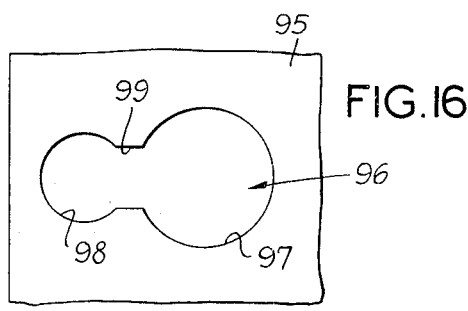
FIG.13
FIG.16
Inventor
Eric Birger Fernberg
by Malcolm W. Fraser
attorney

United States Patent Office 3,213,506
Patented Oct. 26, 1965

3,213,506
FASTENER
Eric Birger Fernberg, Wavendon, near Bletchley, England, assignor to F.T. Products Limited, London, England, a British company
Filed Oct. 12, 1962, Ser. No. 230,084
Claims priority, application Great Britain, Oct. 13, 1961, 36,891/61; Oct. 18, 1961, 37,400/61; Nov. 17, 1961, 41,320/61; Mar. 6, 1962, 8,689/62
1 Claim. (Cl. 24—217)

The present invention relates to an improved fastener which is particularly although not exclusively suitable for use in attaching a trim pad to an apertured metal panel forming part of the body of a vehicle.

It is common practice at the present time to trim the inside of vehicles with the aid of sheet-like pads which are gripped at spaced intervals, usually around their edges, by fasteners which are designed to pass through apertures formed in the sheet metal body of the vehicle.

The trim pad is normally covered with a material which is wrapped over and around the edge of the trim pad and glued to its back surface. Consequently the edge of the finished trim pad is considerably thicker than the centre and if the centre is held flat against the panel to which it is secured the trim pad presents a curved or bowed appearance. To avoid this bowing the trim pad must be spaced from the panel and the fastener of the present invention may be conviently used for this purpose.

According to the invention there is provided a fastener comprising a stud formed from a mouldable material so as to have a head and a stem extending therefrom, the head having a substantially circular main flange adjacent the stem and a substantially circular retaining flange spaced along the length of the stud, from the main flange, wherein the main flange is of greater diameter than the retaining flange.

According to a further aspect of the invention there is provided a fastener comprising a stud as defined in the preceding paragraph, and a socket, wherein the socket comprises a tubular shank having at one end a retaining rim and adjacent thereto an external circumferential groove, and the stem of the stud is of such dimensions that it is a friction fit within the tubular shank of the socket.

According to yet a further aspect of the invention there is provided an assembly of two apertured members secured together with the aid of a fastener as defined in the preceding paragraph but one, wherein one member is formed with a key-hole slot comprising a major circular hole and a minor circular hole formed by a waisted portion, the diameter of the minor hole being less than the diameter of either of the flanges on the head of the stud and greater than the diameter of the neck of the head of the stud, the waisted portion of the slot being smaller in width than the diameter of the said neck and the diameter of the major hole being greater than the diameter of the retaining flange and less than the diameter of the main flange, the arrangement being such that the retaining flange and neck of the head of the stud are passed through the major hole, the neck of the stud is snap-engaged through the waisted portion and into the minor hole to be retained therein by the said flanges and the stem of the stud is engaged in the aperture in the said other member to retain the said one member thereto.

Figure 1:
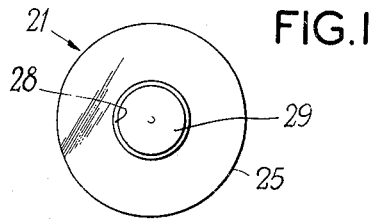
Figure 6:
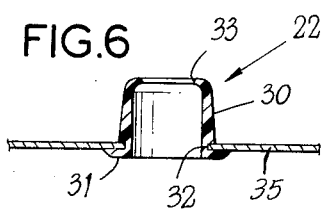
Figure 3:
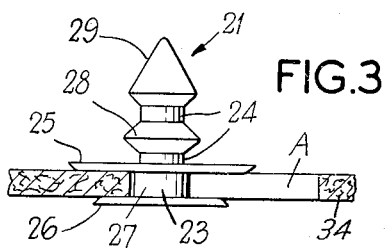
Figure 5:
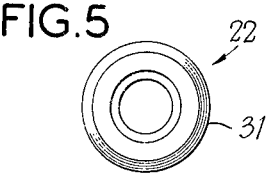
Figure 2:
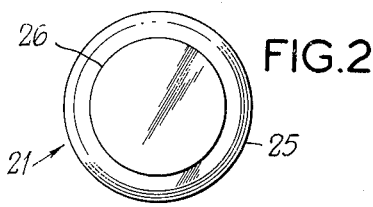
Figure 7:
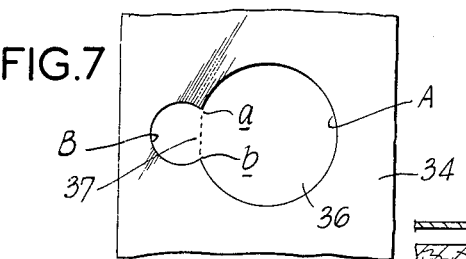
Figure 8:
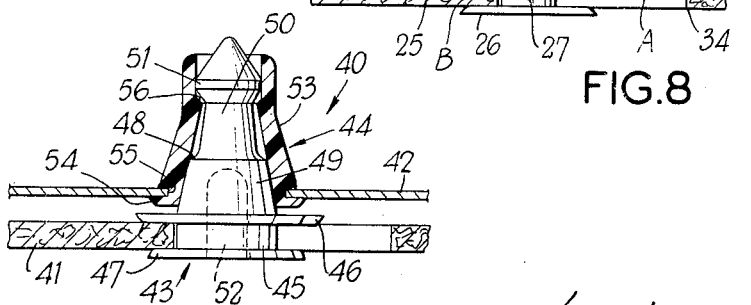
Figure 9:
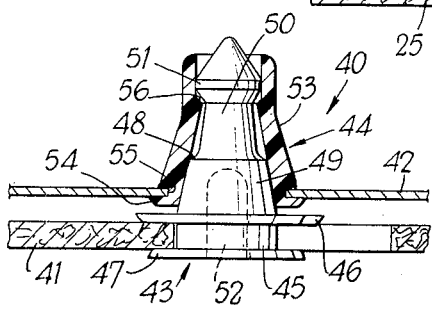

Preferred forms of the invention will now be described with reference to the accompanying drawings in which:

FIGURES 1, 2 and 3 are, respectively, a front elevation, rear elevation and plan of the stud portion of a two-part fastener, FIGURE 3 showing also a portion of a trim pad, FIGURES 4, 5, and 6 are, respectively, a front elevation, rear elevation and axial section of a socket which constitutes the other part of the two-part fastener, FIGURE 6 showing also a portion of vehicle body panel, FIGURE 7 is an elevation of a portion of a trim pad formed with a key-hole shaped slot, FIGURE 8 is a plan, also partly in section, of an assembled trim pad, two-part fastener and panel, FIGURE 9 is a plan view, partly in section, of a modification of the two-part fastener of FIGURES 1 to 8, FIGURE 10 is a plan view, partly in section, of a further modification of the two-part fastener of FIGURES 1 to 8, FIGURE 11 is a plan view, partly in section of a modification of the fastener of FIGURE 10, FIGURE 12 is a plan view, partly in section of an assembly showing a fastener, which is a modification of the invention, securing a trim pad to a panel, FIGURE 13 is an elevation of the fastener shown in FIGURE 12, FIGURES 14 and 15 are respectively a plan view and an elevation of a modification of the fastener shown in FIGURE 13, and FIGURE 16 is an elevation showing a portion of a trim pad similar to that shown in FIGURE 7 with a modified form of key-hole slot.

The two-part fastener which is indicated generally at 20 in FIGURE 8 is preferably moulded from a synthetic plastics material such as polypropylene and comprises a stud 21 shown in FIGURES 1 to 3, and socket 22, shown in FIGURES 4 to 6.

The stud 21 has a head 23 from which extends a stem 24. The head 23 is formed with a substantially circular main flange 25 adjacent the stem 24 and, spaced from the main flange 25, a retaining flange 26. The main flange 25 and the retaining flange 26 are joined by a neck 27 which is substantially cylindrical, and the main flange 25 may, if desired, be dished so as to be concave towards the stem, to act as a sealing skirt in the final assembly.

The stem 24, which extends from the main flange 25, is formed, intermediate its length with a biconical circumferential shoulder 28 and at the end remote from the head 23 with a bulbous, conical nose 29. The external diameter of the nose 29 is slightly less than that of the shoulder 28.

The socket 22 comprises a tubular shank 30 having at one end an annular retaining rim 31 adjacent to which the wall of the shank has a circumferential groove 32. The tubular shank 30 is externally slightly conical and is reduced slightly at its end 33.

The length of the shank 30 of the socket is equal to, or a little less than, the distance between the outer face of the main flange 25 and the point of maximum diameter of the nose 29 of the stud, and the maximum diameter of the circumferential shoulder 28 is slightly greater than the internal diameter of the tubular shank 30 of the socket.

The two-part fastener 21, 22 may be used to secure a trim pad to an apertured metal panel of a vehicle in the manner illustrated in FIGURES 7 and 8.

A portion of a trim pad is shown at 34, and at 35 there is shown a metal panel formed with a circular aperture of diameter equal to, or a little greater than, the minimum diameter of the groove 32.

The trim pad 34 is formed with a series of appropriately spaced slots 36 each of key-hole shape, one of which is shown in FIGURE 7.

The periphery of the aperture 36 comprises two overlapping circular holes A and B. The distance between the points of intersection $a$ and $b$ of the holes constitutes a union chord 37, common to both circles, which is a little less than the diameter of the neck 27 of the head 23 and which constitutes a waisted portion of the slot 36. The major circle A is of diameter a little greater than that of the retaining flange 26 and less than that of the main flange 25 and the minor circle B is of a diameter a little greater that that of the neck 27 and less than that of either of the flanges 25 and 26.

In order to attach the trim pad 34 to the panel 35 a socket 22 is pushed into each aperture in the metal panel so that the groove 32 in the socket seats around the rim of the aperture, as shown in FIGURE 6.

A stud 21 is then secured in each key-hole slot 36 in the trim pad by first pushing the retaining flange 26 of the stud through the major hole A until the main flange 25 seats against the trim pad. The neck 27 of the head of the stud is then snap-engaged through the waisted portion, or common chord a, b between the holes A and B so that the neck 27 seats in the minor hole B. Finally each stud 21 is pushed into a socket 22 into the assembled position shown in FIGURE 8.

As the stud passes through the socket the nose 29 of the stud expands and then snaps through the reduced end 33 of the socket so as to hold the stud securely therein. At the same time the slightly larger diameter circumferential shoulder 28 on the stud slides as a tight frictional fit partway through the socket, providing an efficient sealing of the socket, and thus of the aperture in the panel 35.

A modification of the two-part fastener 20 is indicated generally at 40 in FIGURE 9.

The two-part fastener 40 is used, as shown in FIGURE 9, in the same manner and for the same purpose as the fastener 20, to secure a trim pad 41 to an apertured panel 42 which are similar in every respect to the trim pad 34 and panel 35.

The fastener 40 comprises a stud 43 and a socket 44. The stud 43 has a head 45, which is formed with two flanges 46 and 47 and is similar to the head 23 of the stud 21, and a stem 48. The stem 48 has a frustro conical base 49 adjacent the flange 46, a neck 50 of reduced diameter and a bulbous nose 51. The head of the stud is conveniently formed with a bore 52 which runs into the base 49 to reduce the weight of the stud and save material.

The socket 44 has a tubular shank 53 extending from an annular retaining rim 54 and formed with an external circumferential groove 55 adjacent the rim 54 for engagement on the edge of the aperture in the panel 42.

The internal diameter of the tubular shank 53 decreases towards a rib 56 formed internally of the shank and intermediate its length.

The fastener 40 is used in the same manner as the fastener 20. The stud 43 is attached to the trim pad 41 in the above described manner and the socket 44 is inserted in an aperture in the panel 42 as shown. The trim pad 41 is then brought up to the panel 42 and the stem of the stud pressed home into the socket until the bulbous nose 51 of the stem snaps past the rib 56 in the shank of the socket.

The dimensions of the stud and socket are such that when assembled in the position shown the base 49 of the stem is a tight friction fit in the tubular shank of the socket thus ensuring a complete sealing of the aperture in the panel 42.

A further modification of the two-part fastener 20, described with reference to FIGURES 1 to 8, is indicated generally at 60 in FIGURE 10.

The two-part fastener 60 comprises a stud 61 and a socket 62.

The stud 61 has a head 63 from which extends a stem 64. The head 63 is similar to the head 23 of the stud of the two-part fastener 20 and is shown attached in the same manner to a trim pad. The stem 64 is in the shape of a right circular cylinder and formed with a hemispherical nose 65 to facilitate lead-in to the socket 62.

The socket 62 comprises an annular retaining rim 66 from which extends a tubular shank 67 formed adjacent the rim 66 with an external circumferential groove 68 for engagement as shown on the edge of an aperture in a panel.

The bore of the tubular shank tapers inwardly intermediate its length so as to be of smaller diameter at the free end 69 of the shank than adjacent the rim 66.

The diameter of the stem 64 of the stud is such that it will pass easily into the tubular shank until it encounters the tapered portion of the bore and is thereafter a tight frictional fit within the shank 67 to seal the aperture in the panel and secure the trim pad thereto.

A modification of the fastener 40 is shown at 60a in FIGURE 11.

The fastener 60a is similar to the fastener 60 except that both the bore in the shank of the socket and the stem of the fastener 60a are correspondingly stepped as shown so that the stem is a tight frictional fit within the reduced end of the bore.

Additionally the cylindrical head of the stud of the fastener 60a is narrower than the stem.

A modification of the invention is shown in FIGURES 12 and 13 in which a fastener is indicated generally at 70.

The fastener 70 comprises a stud having a head 71 and a stem 72.

The head 71 is cylindrical and has a main flange 73, adjacent the stem 72, in the form of an annular sealing skirt, and a retaining flange 74.

The stem 72 has a neck 75 of reduced diameter intermediate its length and bi-conical bulbous nose 76 having a maximum diameter at 77 and terminating in an end portion 78. The stem is split longitudinally into four tongues 79 which extend over a major part of the length of the nose 76 and which will flex inwardly in a radial direction with respect to the stem.

The fastener 70 is used, as shown in FIGURE 12 to attach a trim pad 80 to an apertured panel 81. The trim pad 80 is formed with a number of spaced key-hole slots, one of which is shown at 82 and a fastener 70 is assembled in each slot 82 in the manner described with reference to the fastener 20 and FIGURES 1 to 8.

The trim pad 80 is brought up to the panel 81, which is formed with circular apertures, one of which is shown in the figure at 83, and which are spaced to receive the fasteners 70, and the stem of each fastener is then pressed home into an aperture in the panel.

As the stem of each fastener is pressed home into an aperture in the panel 81 the tongues 79 compress radially to allow the nose 76 of the fastener to pass through the aperture and then spring open to retain the fastener and trim pad to the panel.

In the assembled position the main flange 73 is flattened slightly against the panel so as to effect an air and water tight seal of the aperture 83.

A modification of the fastener 70 is indicated generally at 90 in FIGURES 14 and 15.

The fastener 90 is similar to the fastener 70 except that it has a main flange 91 which is not dished to the same extent as the main flange 73 of the fastener 70 and a stem 92 which is split over the whole of its length into four tongues 93.

The added length of the tongues 93 gives greater resilience to the stem 92 which facilitates the entry of the stem into an aperture in a panel.

Additionally the stem of the fastener 90 has its point of maximum diameter 94 closer to the head.

It will be seen that all the fasteners described and illustrated herein have the common features of a head formed with two flanges of different diameters engageable in the manner described in a key-hole slot in a trim-pad and a stem engageable in an aperture in a panel.

There is provided, in all cases, a simple and effective manner of attaching a trim pad to an apertured panel so that the trim pad is spaced from the panel and so that the apertures in the panel are sealed against dust and water.

Additionally the above described fasteners can be attached to the trim pad before assembly on the panel and thus transported with the trim pad as a single unit.

The key-hole slots in the trim pad, into which the fasteners of the invention are engaged in the above-described manner may, if desired, be modified to the shape shown in FIGURE 16.

In FIGURE 16 there is shown a trim pad 95 formed with a plurality of spaced key-hole slots, only one of which is shown at 96. The slot 96 comprises a major circular hole 97 joined to a minor circular hole 98 by a waisted portion 99 and any one of the fasteners of the invention may be assembled in the slot 96 in the manner described above.

It will be seen that in the above described assemblies the width of the waisted portion of the slot is critical. If the waisted portion is too narrow the head of the fastener cannot be pressed into the minor hole without damaging either the trim pad or the fastener itself and if too wide the head of the fastener will not be retained in the minor hole.

With the shape of slot shown in FIGURE 7 any alteration in the diameter of the minor hole or in its position relative to the major hole alters the width of the waisted portion. Consequently the slot has to be accurately cut and only small tolerances can be allowed in manufacture. By spacing the major hole 97 from the minor hole 98 by the length of the waisted portion 99 the shaping of the slot 96 avoids these disadvantages.

In addition the diameter of the minor hole may be deliberately increased up to a little less than the diameter of the major hole so as to allow a limited amount of play to the head of the fastener when engaged in the minor hole of the slot without affecting the dimensions of the waisted portion 99.

I claim:

A fastener comprising a unitary stud and a socket formed from moldable material, said stud having a head and a stem extending therefrom, said head having a substantially circular main flange adjacent said stem and a substantially circular retaining flange spaced along the length of the stud from the main flange, said main flange being of greater diameter than said retaining flange, and said socket having a tubular shank with a retaining rim at one end thereof and an external circumferential groove adjacent said rim, the other end of the tubular shank being of reduced internal cross section and the stem of the stud being of such dimensions that it has a friction fit in the tubular shank, said stem of the stud having a bulbous conical nose at the end thereof remote from the head and a circumferential shoulder intermediate the length of said stem, said shoulder being of greater diameter than said nose, and said stem being of such dimensions that upon insertion into the socket the nose will snap engage through the reduced end of the tubular shank and said shoulder will form a seal engagement with the internal wall of the tubular shank.

References Cited by the Examiner

UNITED STATES PATENTS

| | | | |
|---|---|---|---|
| 1,387,107 | 8/21 | Carr | 24—214 |
| 1,760,267 | 5/30 | Carr | 189—34 |
| 1,904,077 | 4/33 | Place | 24—213 |
| 1,948,462 | 2/34 | Le Page | 24—213 |
| 2,041,606 | 5/36 | Hofmann | 24—224 |
| 2,358,206 | 9/44 | Boersma | 85—5 X |
| 2,505,955 | 5/50 | Fuller | 24—224 |
| 2,651,093 | 9/53 | Lynch | 24—224 |
| 2,780,128 | 2/57 | Rapata | 85—5 |
| 2,785,453 | 3/57 | Wentz | 24—217 |
| 3,029,486 | 4/62 | Raymond | 24—73 |
| 3,063,114 | 11/62 | Perrochat | 24—73 |

FOREIGN PATENTS

| | | |
|---|---|---|
| 360,591 | 3/06 | France. |
| 91,282 | 2/23 | Austria. |

DONLEY J. STOCKING, *Primary Examiner.*